June 20, 1933.  C. N. FOSTER  1,914,850
CIRCULAR ORCHARD SPRINKLER
Filed Sept. 24, 1931
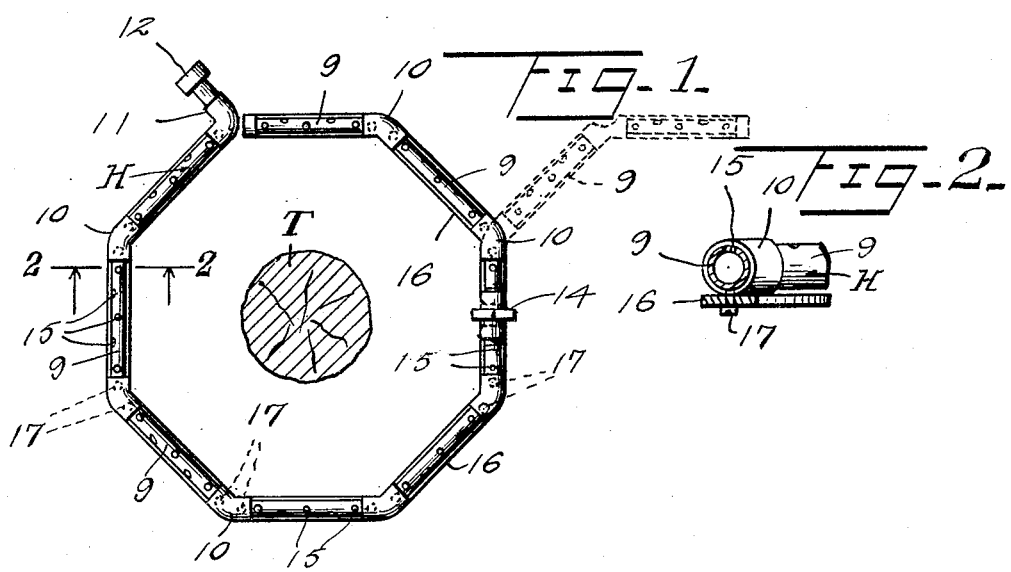
Inventor
*Cecil Nelson Foster*
By *Watson E. Coleman*
Attorney Patented June 20, 1933

1,914,850

UNITED STATES PATENT OFFICE

CECIL NELSON FOSTER, OF WALLA WALLA, WASHINGTON

CIRCULAR ORCHARD SPRINKLER

Application filed September 24, 1931. Serial No. 564,875.

This invention relates to circular orchard sprinklers, and it is an object of the invention to provide a device of this kind which may be positioned around the lower portion of the trunk of a tree in a manner to assure effective irrigation of the surrounding soil.

Another object of the invention is to provide a device of this kind having a part assembled for such movement or adjustment to permit the ready placement of the device around the trunk of a tree.

The invention consists in the details of construction and in the combination and arrangement of the several parts of my improved circular orchard sprinkler whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in top plan illustrating a circular orchard sprinkler constructed in accordance with an embodiment of my invention;

Figure 2 is a detailed sectional view taken substantially on the line 2—2 of Figure 1.

In the embodiment of my invention as illustrated in the accompanying drawing, the head H comprises a plurality of straight pipe sections 9 joined together by the elbow unions or couplings 10. The elbow unions or couplings 10 are such as to have adjacent pipe sections 9 in angular relation and with a resultant assembly whereby the complete head H is of a polygonal type adapted to be disposed around the trunk of a tree. One end pipe section 9 is continued by an outwardly directed extension 11 carrying means, as at 12, to permit a hose to be properly connected thereto.

One of the intermediate pipe sections comprises two separate parts coupled or united by a union 14 so that one section may be caused to rotate with respect to the other whereby the adjacent end section of the head H can be swung aside into an open position to permit the ready application of the head H around the trunk of a tree.

Each of the pipe sections 9 is provided therealong with the jet or spray openings 15.

In order to make the sprinkler as particularly illustrated in Figure 1 to possess the desired effective rigidity, the pipe sections 9 have associated therewith the frame plates 16 suitably secured or anchored to the elbows or couplings 10 by screws 17 or the equivalent.

By the use of these frame plates, the pipe sections 9 are held against displacement and it will be seen that these plates are so arranged as to offer no hindrance or obstruction to the desired movement afforded by the union 14.

In this embodiment of my invention it is believed to be clearly apparent that the pipe sections 9 may each be readily adjusted through the instrumentality of a pipe wrench or the like so that when desired the spray will be at different angles.

From the foregoing description it is thought to be obvious that a circular orchard sprinkler constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. As a new article of manufacture, an orchard sprinkler comprising a head in simulation of a circle, said head comprising two members, a union connecting adjacent end portions of the members to allow one member to be swung outwardly with respect to the other, each of said members comprising a plurality of pipe sections and interposed elbow unions, and a frame plate coacting with the sections of each member to hold said sections against displacement.

2. As a new article of manufacture, an orchard sprinkler comprising a head in simulation of a circle, said head comprising two members, a union connecting adjacent end portions of the members to allow one member to be swung outwardly with respect to the other, each of said members comprising a plurality of pipe sections and interposed elbow unions, and a frame plate secured to the unions to hold said sections against displacement.

In testimony whereof I hereunto affix my signature.

CECIL NELSON FOSTER.